United States Patent
Kowalczyk et al.

(10) Patent No.: US 10,515,092 B2
(45) Date of Patent: Dec. 24, 2019

(54) STRUCTURED RECORD COMPRESSION AND RETRIEVAL

(71) Applicant: Google LLC, Mountain View, CA (US)

(72) Inventors: Marcin Kowalczyk, Uster (CH); Robert Obryk, Zurich (CH); Jyrki Alakuijala, Wollerau (CH); Alkis Evlogimenos, Pfaffikon (CH); Jan Wassenberg, Langnau am Albis (CH); Tomas Dzetkulic, Zurich (CH)

(73) Assignee: Google LLC, Mountain View, CA (US)

( * ) Notice: Subject to any disclaimer, the term of this patent is extended or adjusted under 35 U.S.C. 154(b) by 117 days.

(21) Appl. No.: 15/656,485

(22) Filed: Jul. 21, 2017

(65) Prior Publication Data
US 2019/0026350 A1    Jan. 24, 2019

(51) Int. Cl.
G06F 17/30    (2006.01)
G06F 16/25    (2019.01)
G06F 16/22    (2019.01)

(52) U.S. Cl.
CPC ........ G06F 16/258 (2019.01); G06F 16/2282 (2019.01)

(58) Field of Classification Search
CPC ....................................................... G06F 16/00
See application file for complete search history.

(56) References Cited

U.S. PATENT DOCUMENTS

| | | | |
|---|---|---|---|
| 2010/0030748 A1* | 2/2010 | Netz ................ | G06F 16/24557 707/769 |
| 2012/0016901 A1 | 1/2012 | Agarwal et al. | |
| 2012/0143913 A1* | 6/2012 | Beier ..................... | H03M 7/40 707/776 |
| 2015/0278268 A1* | 10/2015 | El-Ali ................ | G06F 16/2237 707/722 |
| 2016/0094242 A1 | 3/2016 | Ackerman et al. | |
| 2016/0314055 A1 | 10/2016 | Bagchi et al. | |
| 2017/0024439 A1* | 1/2017 | Chavan ............... | G06F 17/2217 |
| 2019/0079984 A1* | 3/2019 | Lancaster ............ | G06F 16/285 |

OTHER PUBLICATIONS

International Search Report and Written Opinion for Application No. PCT/US2018/027557 dated Jun. 7, 2018. 15 pages.

* cited by examiner

*Primary Examiner* — Khanh B Pham
(74) *Attorney, Agent, or Firm* — Lerner, David, Littenberg, Krumholz & Mentlik, LLP

(57) ABSTRACT

This technology relates to encoding data. For example, a sequence of one or more structured records as input data, at least one of the structured records including one or more field tags and associated field data. The input data may be parsed into data buffers, each data buffer corresponding to a field tag in the one or more field tags, wherein each data buffer includes the associated field data of the corresponding field tag. A control sequence specifying a sequence of the one or more fields tags may be encoded into a transition record. A state machine comprising nodes and transitions may be generated, with each node corresponding to occurrences of the one or more field tags and each transition corresponding to successive pairs of the one or more field tags. The data buffers, a representation of the state machine, and the encoded control sequence may be output.

20 Claims, 8 Drawing Sheets

STRUCTURED RECORD COMPRESSION AND RETRIEVAL

BACKGROUND

The amount of data produced by computer devices is growing at a rapid rate, with hundreds of billions of gigabytes already produced. As the number of computing devices being used continues to grow, the amount of generated data will only continue to increase, and efficient storage and retrieval of the data produced by the computing devices will become paramount.

A large portion of the data generated by computing devices comes in the form of log files, which record the daily operations performed by the respective computing devices. There are many methods for storing log files, including compressing the data to reduce its size. However, current compression techniques are generally inefficient and result in the storing of repetitive data. Further, retrieving portions of data from a compressed file typically requires the decompression of the entire compressed file.

SUMMARY

Embodiments within the disclosure relate generally to transposing and encoding data comprising structured records into data structures and efficiently compressing these data structures. One aspect includes a method for encoding data, comprising the steps of obtaining, by one or more processing devices, a sequence of one or more structured records as input data, at least one of the structured records including one or more field tags and associated field data. The one or more processing devices may parse the input data into data buffers, each data buffer corresponding to a respective field tag in the one or more field tags, wherein each data buffer includes the associated field data of the corresponding field tag. Since each data buffer includes data corresponding to a respective field tag, uniformity of data included in different structured records for one and the same field tag enables opportunities for more effective compression. The one or more processing devices may encode a control sequence into a transition record, where the control sequence specifies a sequence of the one or more fields tags and generate a state machine comprising nodes and transitions, wherein each node corresponds to occurrences of the one or more field tags and each transition corresponds to successive pairs of the one or more field tag. The one or more processing devices may output the data buffers, a representation of the state machine, and the encoded control sequence.

In some examples, prior to the outputting, the data buffers, a representation of the state machine, and the encoded control sequence are compressed individually. In some examples, a different compression algorithm may be used to compress the data buffers, the representation of the state machine, and the encoded control sequence. In this manner, the compression algorithm can account for the characteristics of the respective data to be compressed such that a speed and/or ratio of compression can be improved individually for the different data buffers, the representation of the state machine, and the encoded control sequence.

In some examples, two or more of the one or more field tags are the same, and a single data buffer corresponds to the two or more field tags. In this regard, a compression algorithm used to compress the single data buffer with data corresponding to two or more field tags that are the same may uncover even more compression opportunities and thus improve compression ratio. In some examples, at least one of the one or more field tags are not associated with field data and the at least one of the one or more field tags are not parsed to a corresponding data buffer. In this manner, there may be no data or space allocated in the data buffer for the case where a field tag is not associated with field data, thus saving storage space in the buffer and leading to a more compact compressed representation when the buffer is compressed. In some examples, separation field tags indicating the separation of one structured record to another structured record may be interspersed through the control sequence. In that way, the end of a structured record and the start of a new structured record can be identified when decoding structured records from the transposed representation of the record data in separate data buffers per field tag.

In some examples, each transition between the successive pairs of the one or more field tags a transition label is encoded into the transition record. The transition record may provide direction on how to decode the structured records from the transposed representation of the record data in separate data buffers per field tag. In some examples, the successive pairs of the one or more field tags with only a single transition are not encoded into the transition record. In that manner, the transition record may become more compact. In some examples, successive pairs of the one or more field tags which occur more frequently in the control sequence are encoded with a transition label having a bit sequence which is more compact than that of the successive pairs of the one or more field tags having less common transitions. In that way, the representation of the overall control sequence can be more compact.

Another aspect includes a system for encoding data, comprising one or more computing devices an memory storing instructions, which when executed by the one or more computing devices, cause the one or more computing devices to obtain a sequence of one or more structured records as input data, at least one of the structured records including one or more field tags and associated field data; parse the input data into data buffers, each data buffer corresponding to a respective field tag in the one or more field tags, wherein each data buffer includes the associated field data of the corresponding field tag; encode a control sequence into a transition record, where the control sequence specifies a sequence of the one or more fields tags; generate a state machine comprising nodes and transitions, wherein each node corresponds to occurrences of the one or more field tags and each transition corresponds to successive pairs of the one or more field tags; and output the data buffers, a representation of the state machine, and the encoded control sequence.

Another aspect includes a non-transitory computer readable medium storing instructions, which when executed by one or more parallel processors, cause the one or more parallel processors to perform the steps of: obtaining a sequence of one or more structured records as input data, at least one of the structured records including one or more field tags and associated field data; parsing the input data into data buffers, each data buffer corresponding to a respective field tag in the one or more field tags, wherein each data buffer includes the associated field data of the corresponding field tag; encoding a control sequence into a transition record, where the control sequence specifies a sequence of the one or more fields tags; generating a state machine comprising nodes and transitions, wherein each node corresponds to occurrences of the one or more field tags and each transition corresponds to successive pairs of the one or more field tags; and outputting the data buffers, a representation of the state machine, and the encoded control sequence.

Another aspect includes method for decoding data comprising one or more data buffers, a representation of a state machine, and an encoded control sequence, the steps comprising outputting a sequence of structured records by repeatedly reading a transition from the encoded control sequence, advancing the state machine to a new state, and performing an action assigned to the new state, wherein the action includes determining, based on the new state, information about a field, a field length, and a data buffer of the one or more data buffers to read from reading a value according to the field length from the data buffer, and outputting a field, value pair according to the field and the value.

In some examples, the step of reading a transition from the encoded control sequence is omitted in a case of an implicit transition, being a transition that has no alternative transitions in the state machine. In some examples, only actions outputting field, value pairs of a predetermined set of fields are performed. In some examples, actions outputting field, value pairs that match a predetermined selection predicate are performed. In some examples, after obtaining one or more data buffers, a representation of a state machine, and an encoded control sequence, separately decompressing each data buffer, the state machine, and the encoded control sequence. In some examples, only data buffers corresponding to fields of a predetermined set of fields are decompressed.

Another aspect includes a system for encoding data, comprising one or more computing devices an memory storing instructions, which when executed by the one or more computing devices, cause the one or more computing devices to output a sequence of structured records by repeatedly reading a transition from the encoded control sequence, advance the state machine to a new state, and perform an action assigned to the new state, wherein the action includes determining, based on the new state, information about a field, a field length, and a data buffer of the one or more data buffers to read from reading a value according to the field length from the data buffer, and outputting a field, value pair according to the field and the value.

Another aspect includes a non-transitory computer readable medium storing instructions, which when executed by one or more parallel processors, cause the one or more parallel processors to perform the steps of: outputting a sequence of structured records by repeatedly reading a transition from the encoded control sequence, advancing the state machine to a new state, and performing an action assigned to the new state, wherein the action includes determining, based on the new state, information about a field, a field length, and a data buffer of the one or more data buffers to read from reading a value according to the field length from the data buffer, and outputting a field, value pair according to the field and the value.

BRIEF DESCRIPTION OF THE DRAWINGS

The present technology is illustrated by way of example, and not by way of limitation, in the figures of the accompanying drawings in which like reference numerals refer to similar elements including.

DETAILED DESCRIPTION

Overview

Figure 1:
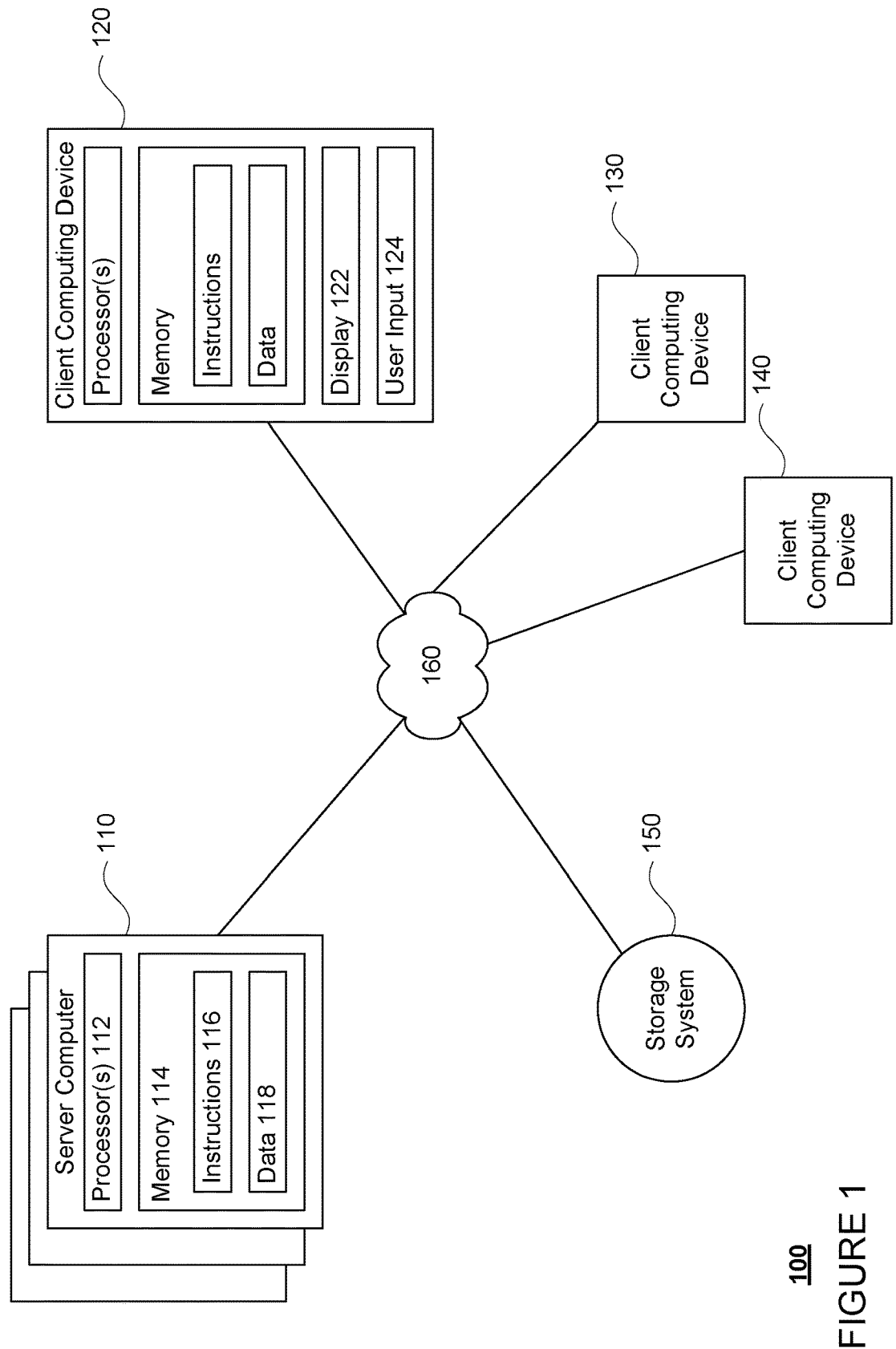
FIG. 1 is a functional diagram of an example system in accordance with aspects of the disclosure.

This technology relates to transposing and encoding data comprising structured records into data structures and efficiently compressing these data structures. In this regard, transposing may include changing the arrangement and storage format of structured record data from a sequence of field tags and respective field data on a per record basis to sequences of field data of the same field tag for different structured records. Upon receiving a request for portions of structured records, the compressed data structures storing the requested data may be efficiently retrieved and decompressed.

The structured records may be parsed and inputted into data buffers based on field tags. In this regard, the data may include structured records comprised of field tags and field data corresponding to each of the field tags. The field tags for each structured record may be inputted into a control sequence, and based on the control sequence, transitions between each field tag may be identified, encoded and stored in a state machine. The state machine, data buffers, and transitions may be compressed. Requested data may then be accessed by determining its location within the compressed data structures and decompressing the requested portion of the compressed data structures.

Data buffers may be generated for each of the field tags in the structured records. In this regard, the data may be parsed and encoded into data buffers and the data buffers may store the field data associated with the field tag for which it was generated.

A control sequence may be generated based on the parsed data and transitions between successive field tags in the control sequence may be determined. In this regard, the control sequence may represent the order of the field tags within each structured record. Transitions between pairs of successive field tags in the control sequence may be assigned a code representing the transitions which occur. Each transition may be encoded with a value and input into a transition record.

A state machine may be generated based on the field tags and transitions. The state machine may include the field tags, represented as nodes, and transitions between the field tags. In this regard, each state of the state machine may representing a respective field tag, with each node storing an identifier of the data buffer associated with the respective field tag represented by the node, the tag and tag length, and for numeric fields, the data length. The state machine may store some or all possible transitions between successive pairs of field tags.

To generate the state machine, a state (i.e., node) for each field tag may be generated. Using the identified transitions, the total number of possible transitions between successive pairs of field tags may be determined. For all states which have a single transition to a successive paired field tag, the transition may be labeled implicit. For states having more than one transition to successive paired field tags, the transitions may be labeled with numbers from one to the total number of possible of transitions.

The data buffers, encoded transitions, and state machine represent the structured records in a fully transposed state. The transposed data, including the data buffers, encoded transition record, and state machine may all be separately compressed and stored separately. The stored data may be a sequence of bytes. In this regard, the same or different compression algorithms may be used to compress the portions of the transposed data.

The features described herein allow for efficient encoding of structured data for the purpose of transfer, storage, and later retrieval. In this regard, the structured data may be efficiently restructured such that the restructured data compresses more efficiently. The more efficient compression of the restructured data may yield smaller output than compressing the inputted structured data directly. Further, the structured data may be stored such that it may be compressed to a greater extent than through currently available methods. Further, only a portion of the compressed data may need to be decompressed in order to retrieve requested data, thereby resulting in increased retrieval rates.

Example Systems

Figure 2:
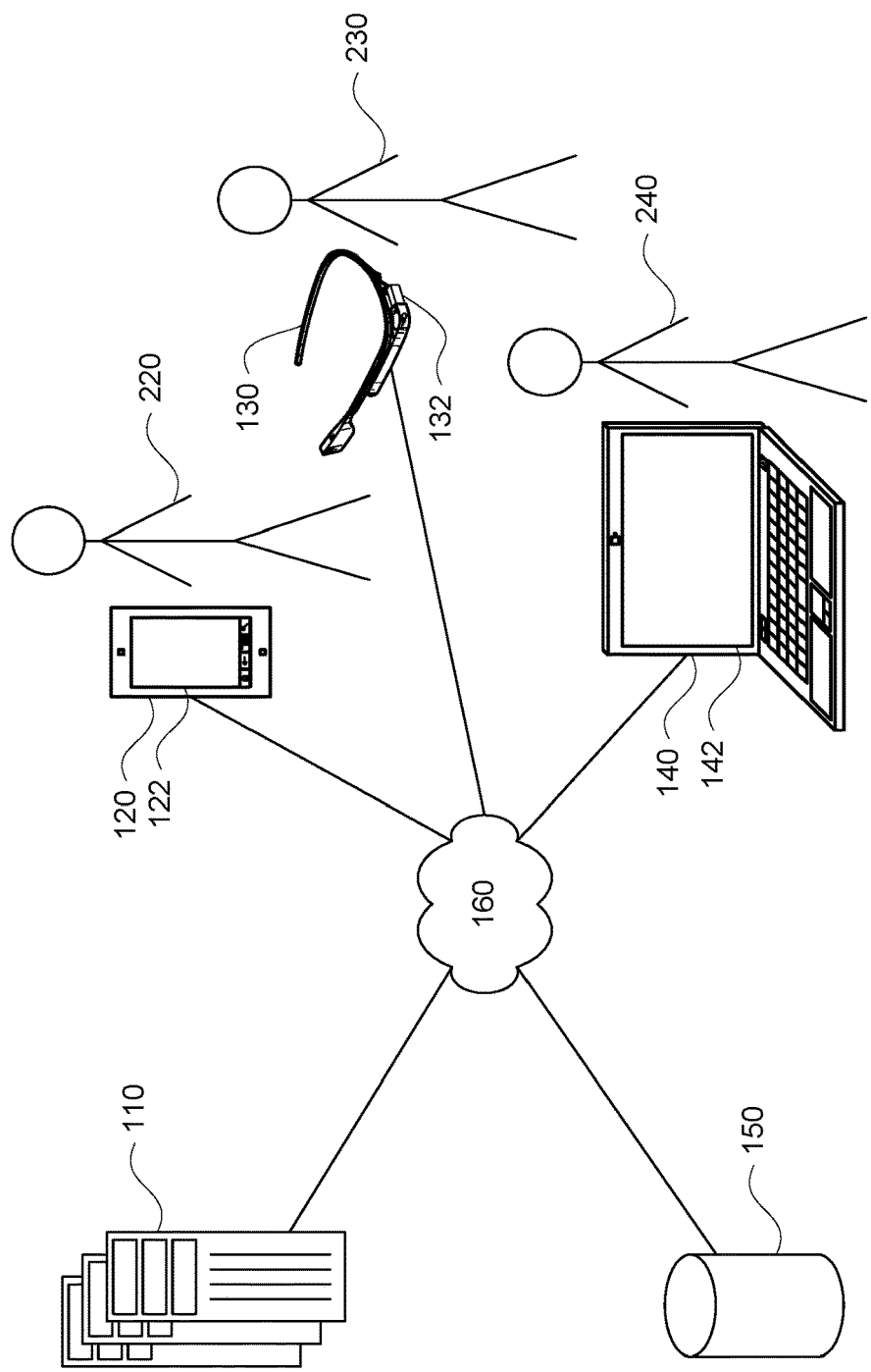
FIG. 2 is a pictorial diagram of the example system of FIG. 1.

FIGS. 1 and 2 show an example system 100 in which the features described herein may be implemented. It should not be considered as limiting the scope of the disclosure or usefulness of the features described herein. In this example, system 100 may include computing devices 110, 120, 130, and 140 as well as storage system 150. Each computing device may contain one or more processors 112, memory 114 and other components typically present in general purpose computing devices. Memory 114 of each of computing devices 110, 120, 130, and 140 may store information accessible by the one or more processors 112, including instructions 116 that can be executed by the one or more processors 112.

The memory may store data that can be retrieved, manipulated or stored by one or more processors. The memory may be of any non-transitory type capable of storing information accessible by the processor, such as a hard-drive, memory card, ROM, RAM, DVD, CD-ROM, write-capable, and read-only memories. Data elements, such as instructions 116 and data 118, may be held in memory spaces.

The instructions 116 may be any set of instructions to be executed directly, such as machine code, or indirectly, such as scripts, by the one or more processors. In that regard, the terms "instructions," "kernels," "application," "steps," and "programs" can be used interchangeably herein. The instructions can be stored in object code format for direct processing by a processor, or in any other computing device language including scripts or collections of independent source code modules that are interpreted on demand or compiled in advance. Functions, methods, and routines of the instructions are explained in more detail below.

Data 118 may be retrieved, stored, and modified by the one or more processors 112 in accordance with the instructions 116. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can be any conventional processors, such as a commercially available CPU. Alternatively, the processors can be dedicated components such as an application specific integrated circuit ("ASIC") or other hardware-based processor.

Although FIG. 1 functionally illustrates the processor, memory, and other elements of the computing devices as being within the same block, the processor, computer, computing device, or memory can actually comprise multiple processors, computers, computing devices, or memories that may or may not be stored within the same physical housing. For example, the memory 114 can be a hard drive or other storage media located in housings different from that of the computing device 110.

References to a processor, computer, computing device, or memory will be understood to include references to a collection of processors, computers, computing devices, or memories that may or may not operate in parallel. For example, the computing device 110 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over network 160.

Each of the computing devices can be at different nodes of a network 160 and capable of directly and indirectly communicating with other nodes of network 160. Although only a few computing devices 110, 120, 130, and 140 are depicted in FIGS. 1-2, it should be appreciated that a typical system can include a large number of connected computing devices, with each different computing device being at a different node of the network 160. The network 160 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, each of the computing devices 110 may include web servers capable of communicating with storage system 150 as well as computing devices 120, 130, and 140 via the network. For example, one or more of server computing devices 110 may use network 160 to transmit and present information to a user, such as user 220, 230, or 240, on a display, such as displays 122, 132, or 142 of computing devices 120, 130, or 140. In this regard, computing devices 120, 130, and 140 may be considered client computing devices, and may perform all or some of the features described herein.

Each of the client computing devices 120, 130, and 140 may be configured similarly to the server computing devices 110, with one or more processors, memory and instructions as described above. Each client computing device 120 or 130 may be a personal computing device intended for use by a user 220 or 230, and have all of the components normally used in connection with a personal computing device such as a central processing unit (CPU), memory (e.g., RAM and internal hard drives) storing data and instructions, a display such as displays 122, 132, or 142 (e.g., a monitor having a screen, a touch-screen, a projector, a television, or other device that is operable to display information), and user input device 124 (e.g., a mouse, keyboard, touch-screen, or microphone). The client computing device may also include a camera for recording video streams and/or capturing images, speakers, a network interface device, and all of the components used for connecting these elements to one another.

Although the client computing devices 120, 130, and 140 may each comprise a full-sized personal computing device, they may alternatively comprise mobile computing devices capable of exchanging data with a server, such as server computing device 110, over a network such as the Internet. By way of example only, client computing device 120 may be a mobile phone or a device such as a wireless-enabled PDA, a tablet PC, or a netbook that is capable of obtaining information via the Internet. In another example, client computing device 130 may be a tablet or laptop computer. In an additional example, client computing device 140 may be a digital camera, such as a 360-degree camera or digital single-lens reflex camera. As an example the user may input information using a small keyboard, a keypad, microphone, using visual signals with a camera, or a touch screen.

As with memory 114, storage system 150 can be of any type of computerized storage capable of storing information accessible by the server computing devices 110, such as a hard-drive, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 160 as shown in FIG. 1 and/or may be directly connected to any of the computing devices 110, 120, 130, and 140 (not shown).

Example Methods

Figure 3:
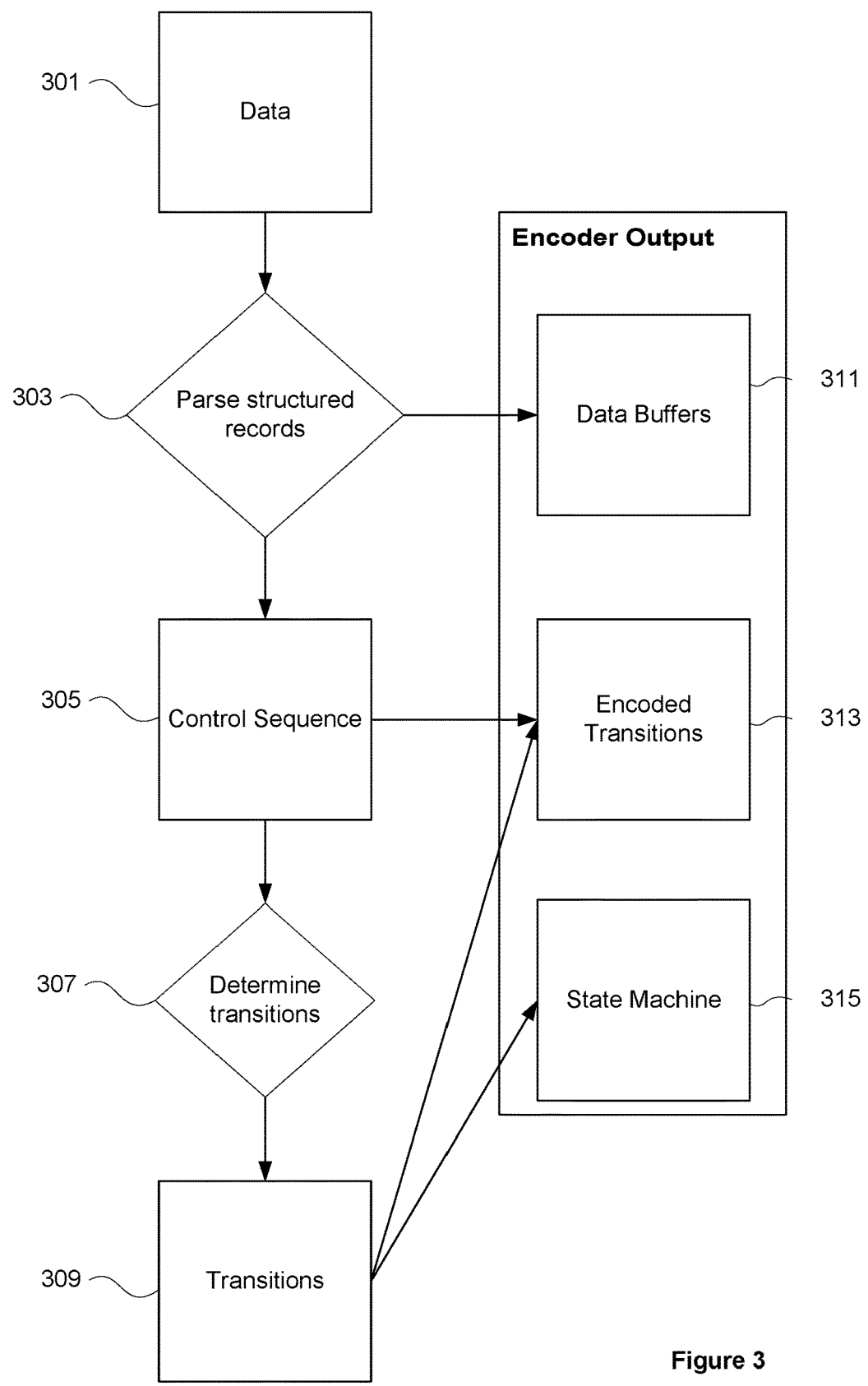
FIG. 3 is an example flow diagram of encoding input data in accordance with aspects of the disclosure.

An overview of an example method for transposing and encoding data, including one or more structured records, is shown in FIG. 3. Initially, the data 301 may be loaded into a processor, such as processor 112 and parsed, as shown in block 303. The parsed data may then be input into data buffers 311 and a control sequence 305 may be generated.

The data may include one or more structured records with each structured record comprising field tags and field data. In this regard, each structured record may include any number of field tags and field data associated with respective field tags. Each structured record may contain the same field tags, unique field tags, no field tags, more than one of the same field tags, or a combination of the same and unique field tags. For instance, as further shown in FIG. 4, all of the structured records 401-405 contain the "first_name" and "last_name" field tags 411, but the second structured record 403 contains the unique field tag of email and does not contain the field tag of state as found in the other two structured records. Moreover, although FIG. 4 shows three structured records 401-405, fewer or more structured records may be possible.

Each field tag may be associated with field data. In this regard, each field tag 411 may be an indicator of the type of field data 413 associated with the respective field tag. For example, as further shown in FIG. 4, the field tag "first_name" is associated with field data which includes first names such as "Anna," "Tim," and "Caroline". Moreover, the field tags 411 may be used to nest additional field tags. For instance, field tag "from", in the third data structure 405, nests the "country" and "state" field tags along with their associated field data of "Australia" and "Vic".

The data may be parsed and encoded into data buffers. In this regard, data buffers 311 may be generated for each of the field tags 411 in the structured records. Each data buffer 431-439 may store the field data associated with the field tag for which that data buffer was generated. For example, as further shown in FIG. 4, a data buffer generated for the "first_name" field tag may include the field data associated with the "first_name" field tag within each of the structured records (i.e., "Anna," "Tim," and "Caroline"). In the event that the same field tag is used to store different data types of field data (e.g., integer, string, Boolean, etc.,) data buffers may be generated for each data type of field data.

Figure 4:
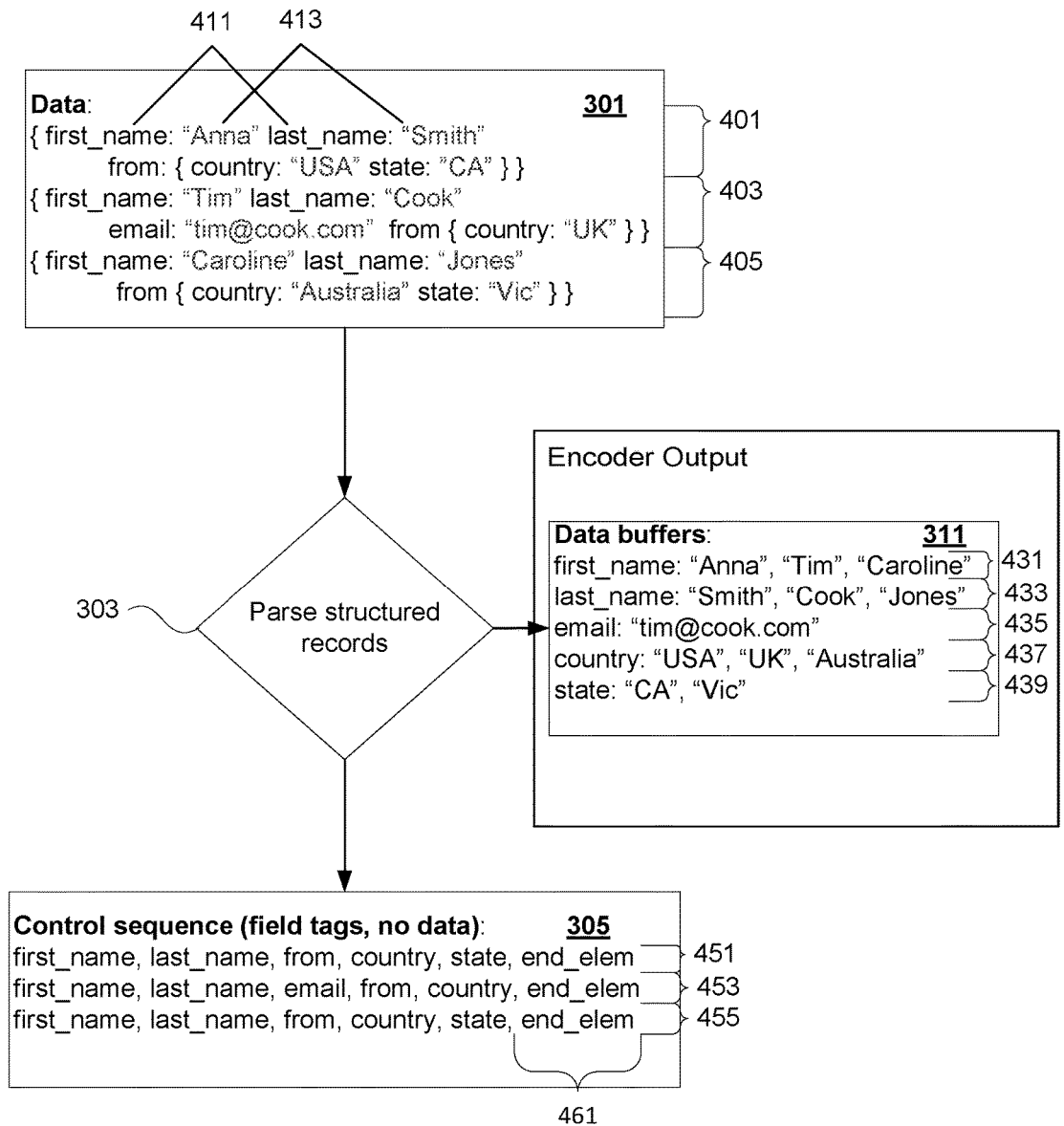
FIG. 4 is an example flow diagram of parsing structured records in accordance with aspects of the disclosure.

Although data buffers for each of the field tags within the structured records are shown in FIG. 4, more or fewer data buffers 311 than the number of field tags in the structured records may be generated. In this regard, two or more of the structured records may include the same field tags, so only a single instance of the data buffer may be generated for this particular field tag. For example, the "first_name" field tag occurs in data structures 401, 403, and 405 but only a single data buffer instance 431 is created for the "first_name" field tag. Additionally, data buffers 311 may not be generated for field tags which do not include associated field data. For example, the "from" field tag, as found in the first and third structured records (401, 405), nests other field tags (i.e., "country" and "state",) but is not associated with its own field data. As such, no from data buffer is generated.

As shown in FIGS. 3 and 4, a control sequence 305 may be generated based on the parsed data. In this regard, the control sequence may represent the order of the field tags 411 within each structured record. For instance, as shown in FIG. 4, the control sequence 305 may include a listing of all of the field tags within the first structured record 451, followed by the field tags within the second structured record 453, and the field tags within the third structured record 455.

Field tags, that indicate the separation of one structured record to another structured record may be interspersed through the control sequence. For example, as further shown in FIG. 4, the control sequence includes a number of field tags "end_elem" 461, which are interspersed into the control sequence after the field tags 411 of each respective structured record 401-405 are input into the control sequence.

Figure 5:
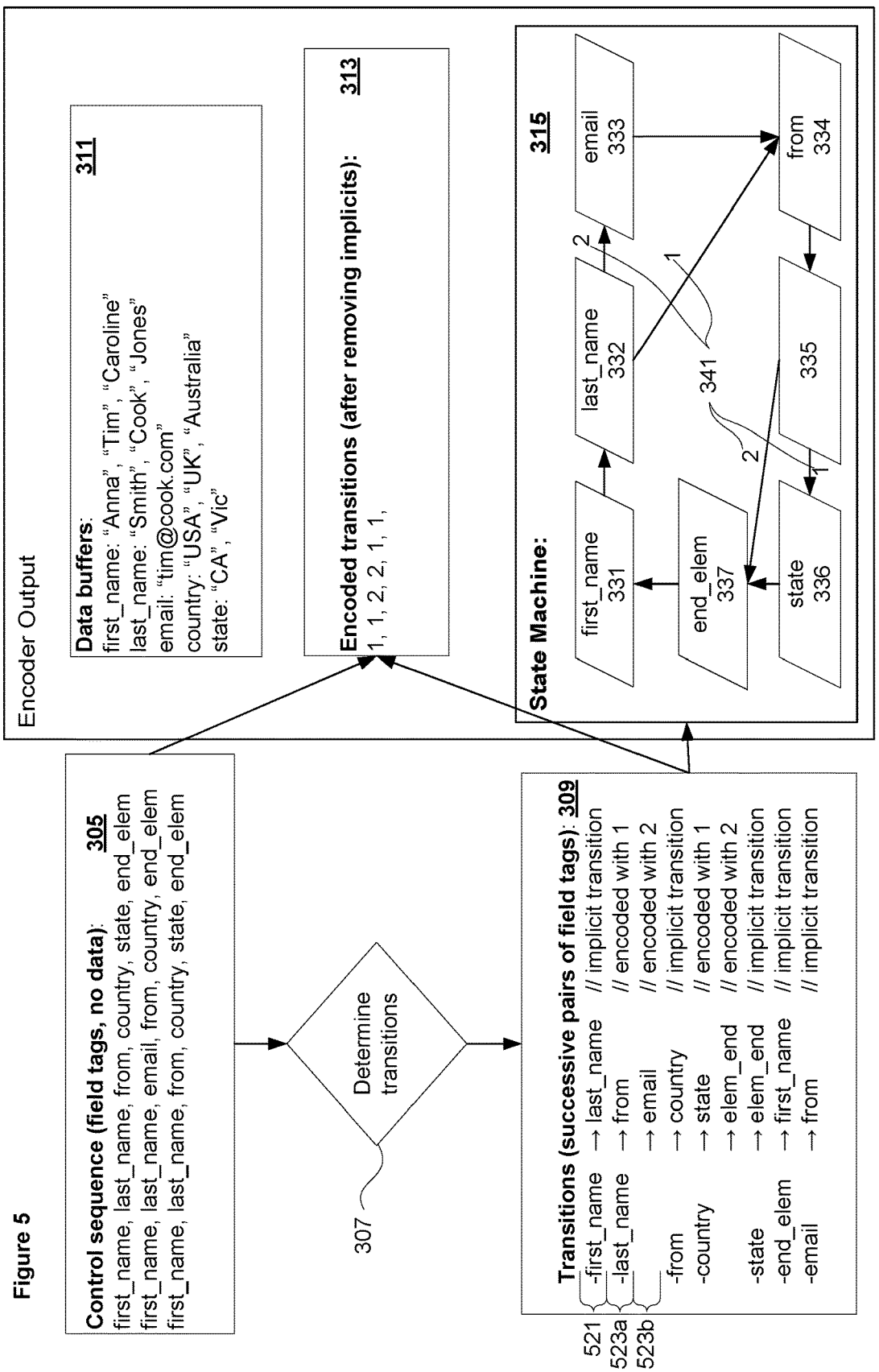
FIG. 5 is an example flow diagram of determining transitions in accordance with aspects of the disclosure.

Referring back to FIG. 3, upon parsing the data, transitions 309 between successive field tags in the control sequence 305 may be determined, as shown in block 307. In this regard, pairs of successive field tags may be assigned a code representing the transitions which occur. For example, the transition between the field tag of "first_name" in the control sequence 305 is always followed by the field tag "last_name", as shown in FIG. 5. As such, all transitions from "first_name" are implicitly to "last_name" and may be considered an implicit transition. In another example, the transitions from the field tag "last_name" include alternative transitions; one to the field tag "from" and another to the field tag "email." As such, the transition from the field tag "last_name" to "from" may be assigned a code, such as 1, as it occurs first in the control sequence, and the transition from the field tag "last_name" to "email" with a code, such as 2, as it occurs second in the control sequence. In order to determine which transitions are implicit as opposed to those which require a transition value (i.e., a code or label), all transitions for a field tag may be analyzed to see if more than one transition is possible.

Each transition code 341 may be encoded into a transition record. In this regard, each determined transition code may be encoded into the transition record 313 in the order in which they occur based on the control sequence 305, as shown in FIG. 5. Further, each implicit transition may be omitted from the transition record 313. For example, as further shown in the transitions 309 block of FIG. 5, the implicit transition from the field tag "first_name" to "last_name" 521 may be omitted from the transition record, while the transitions from the field tag "last_name" to the field tags "from" 523a and "email" 523b may be encoded into the transition record as "1" and "2".

In the event more than two transitions between a field tag and successive field tags occurs, the more common transition may be encoded using a bit sequence which is more compact than that of the less common transition. For example, as further shown in the transitions 309 block of FIG. 5, there are two transitions from the field tag "last_name." The first transition is to the field tag "from" and the second transition to the field tag "email" 523b. Referring to the control sequence 305, it can be seen that the first transition to the field tag "from" 523a occurs twice and the second transition to the field tag "email" 523b occurs once. As such, the first transition may be encoded into the transition record as "1" and the second transition may be encoded as "2". Although the control sequence 305 includes field tags with transitions to at most two other field tags, it is understood that there may be an unlimited number of transitions from one field tag to other field tags.

As further shown in FIG. 3, a state machine may be generated based on the field tags and transitions. Referring now to FIG. 5, the state machine 315 may include the field tags, represented as states 331-337, and transitions codes 341 between the field tags. In this regard, the state machine may include all possible transitions codes 341 between successive pairs of field tags (i.e., nodes).

Figure 6:
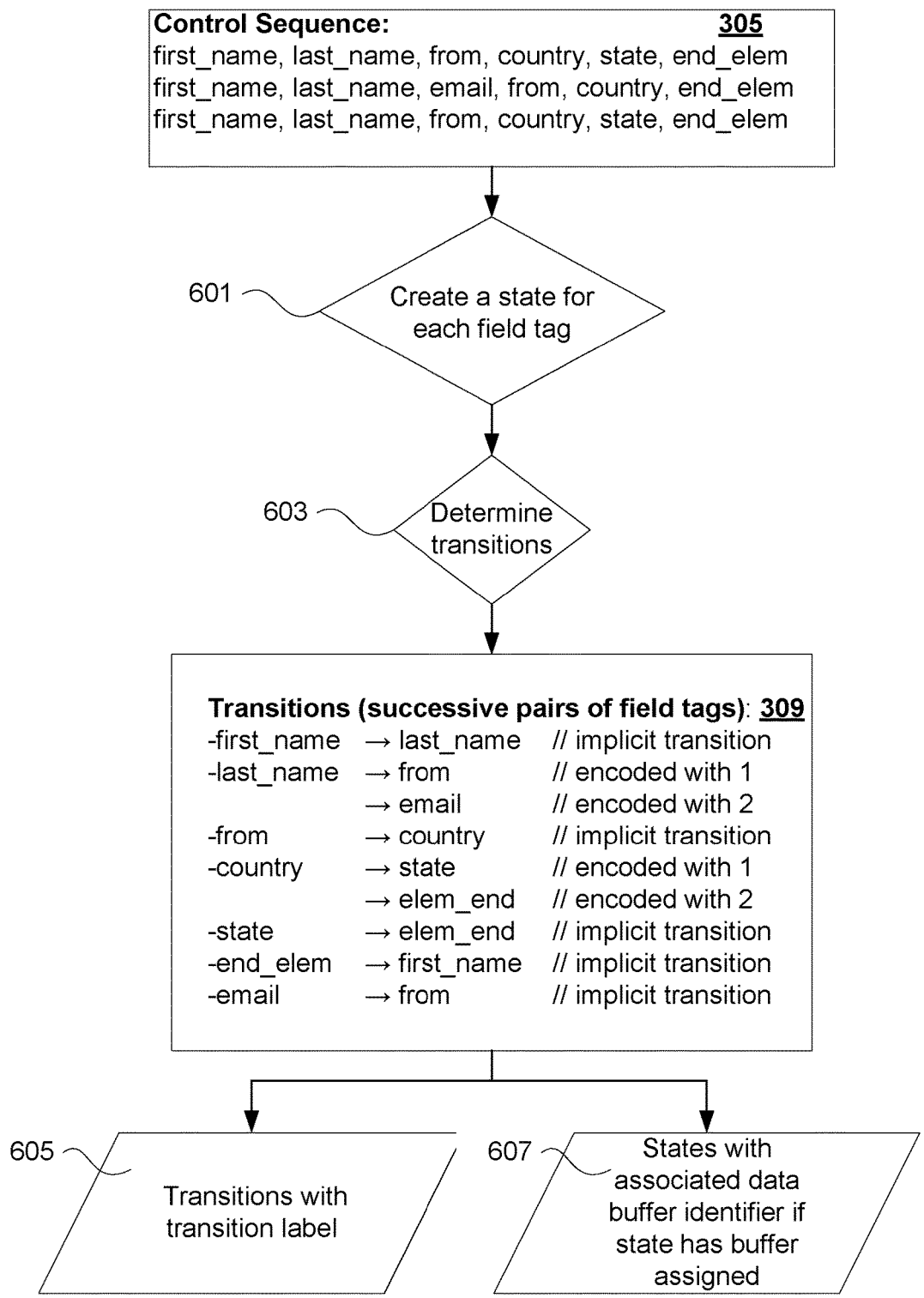
FIG. 6 is a flow diagram of generating a state diagram in accordance with aspects of the disclosure.

The nodes of the state machine may each represent a respective field tag, with each node storing an identifier of the data buffer associated with the respective field tag represented by the node, the field tag and field tag length, and for numeric field tags, the data length. A state (i.e., node) for each field tag may be generated from the control sequence 305, as shown in block 601 of FIG. 6. As previously described herein, and shown at block 603 transitions between successive pairs of field tags may be determined and stored in a transitions block 309. Each state may be stored in association with the transitions which occur from that state to its paired field tags, as shown in block 605. For example, the "last_name" state has two transitions, with the first transition going to "from" and the second transition going to "email." The "from" transition may be encoded with a "1" transition code and the "email" transition may be encoded with a "2" transition code. The state may also be stored in association with an identifier of the data buffer associated with the respective field tag represented by the state as shown in block 607. As a result, the generated state machine 315 may include states, which are associated with the determined transition labels and the data buffer location associated with the field tag represented by the state.

Upon creating the data buffers, encoded transition record, and the state machine, the data is fully transposed and may be compressed. In this regard, the encoder output, including the data buffers, encoded transition record, and state machine may all be separately compressed and stored separately. The compressed data may be represented as a sequence of bytes or other size data.

To enable decompression of only a subset of transposed and compressed structured records within the compressed data, block headers may be interleaved into blocks of data prior to transposing the structured records. In this regard, the one or more structured records may be parsed into blocks having similar sizes. For example, one million structured records may be received as input data. The one million structured records may be separated into ten thousand blocks, with each block containing one hundred structured records. Although the example uses one million structured records, more or fewer structured records may be used. Similarly, the data block size may be larger or smaller than one hundred structured records. Each block or groups of blocks may then be transposed and compressed as described herein.

Block headers may be interleaved at file offsets which are multiples of the block size constant. In this regard, the block headers locate boundaries of the blocks which intersect with a respective header. Data buffer positions within the compressed data may be expressed as pairs containing byte position of the sequence beginning storing the data buffer and the index of the data buffer within the sequence. Continuing the above example, each compressed block may be compressed into a sequence of ten-thousand bytes or more or less. The compressed sequences may be appended together, with block headers being interleaved between each compressed sequence.

Depending on the portion of data requested, only certain data buffers corresponding to the requested data may be uncompressed. In this regard, upon receiving a request for a portion or all of the structured record data, the one or more data buffers, the state machine, and the encoded transitions may be retrieved. The portion of the data requested may be found through seeking to a particular compressed sequence, including navigating to the block header associated with the compressed sequence storing the requested structured record data, transposing the data in the compressed sequence, and decompressing the data of the compressed sequence. As only a subset of field data associated within the data buffers may be requested in a data request, only those data buffers containing the requested field data may be decompressed, while data buffers containing non-requested field data may be left compressed.

Further, based on the control sequence, the requested data corresponding to particular structured records may be determined. For instance, a sequence of structured records may be output by repeatedly reading a transition from the encoded control sequence, advancing the state machine to a new state, and performing an action assigned to the new state. The actions of the new state may include determining, based on the new state, information about a data buffer of the one or more data buffers to read from including the length of field data associated within the data buffers, reading a value of the field data according to the length of the field data from the data buffer, and outputting the value of the field data.

Synchronization markers may be interspersed into the blocks of data. In this regard, the synchronization markers may provide time data, such as a time stamp corresponding to portions of data positioned before and/or after the synchronization marker. The data may then be searched based on time criteria, by finding a synchronization marker associated with a particular time. In some instances the use of synchronization markers may allow embedding of additional data streams within the data, by modifying synchronization markers included in the embedded stream by escape codes or by having synchronization markers in specific positions in the data. For instance, a full copy of a data stream may be embedded within another data stream and synchronization marks within the another data stream may mark where the embedded data stream is located within the another data stream. To avoid synchronization marks within the embedded data stream from appearing as synchronization marks of the stream in which it is embedded, the synchronization marks in the embedded data stream may be modified by adding escape codes.

The process for retrieving a portion or all of the data may be performed using the following algorithm, where the inputted data for a retrieval request includes the state machine (S), the control sequence (CS), the data buffers (DB), and the list of fields to be decoded (F):

```
Step 1. current_state := S[0];
Step 2. IF (F contains current_state.field) THEN // Field should be decoded
   - write current_state.field tag to output
   - If (current_state.has_data_buffer) then
      - write next data element from DB[current_state.data_buffer] to output
Step 3. IF (current_state.outgoing_transitions.size( ) == 1) THEN // Is transition implicit?
      - current_state := current_state.outgoing_transitions[0]
      - GOTO step 2
   ELSE // Transition is not implicit.
      - IF (CS is empty) THEN GOTO step 4. // No more transitions.
      ELSE
         - transition_label := next element in CS
         - current_state := current_state.outgoing_transitions[transition_label]
   - GOTO step 2
```

Unstructured data may also be transposed and encoded. In this regard, unstructured data, such as image files, video files, audio files, etc., may be converted into data containing structured records by defining the unstructured data with classifiers. Upon converting the unstructured data into structured records, encoding and transposing of the data may proceed as discussed herein.

Figure 7:
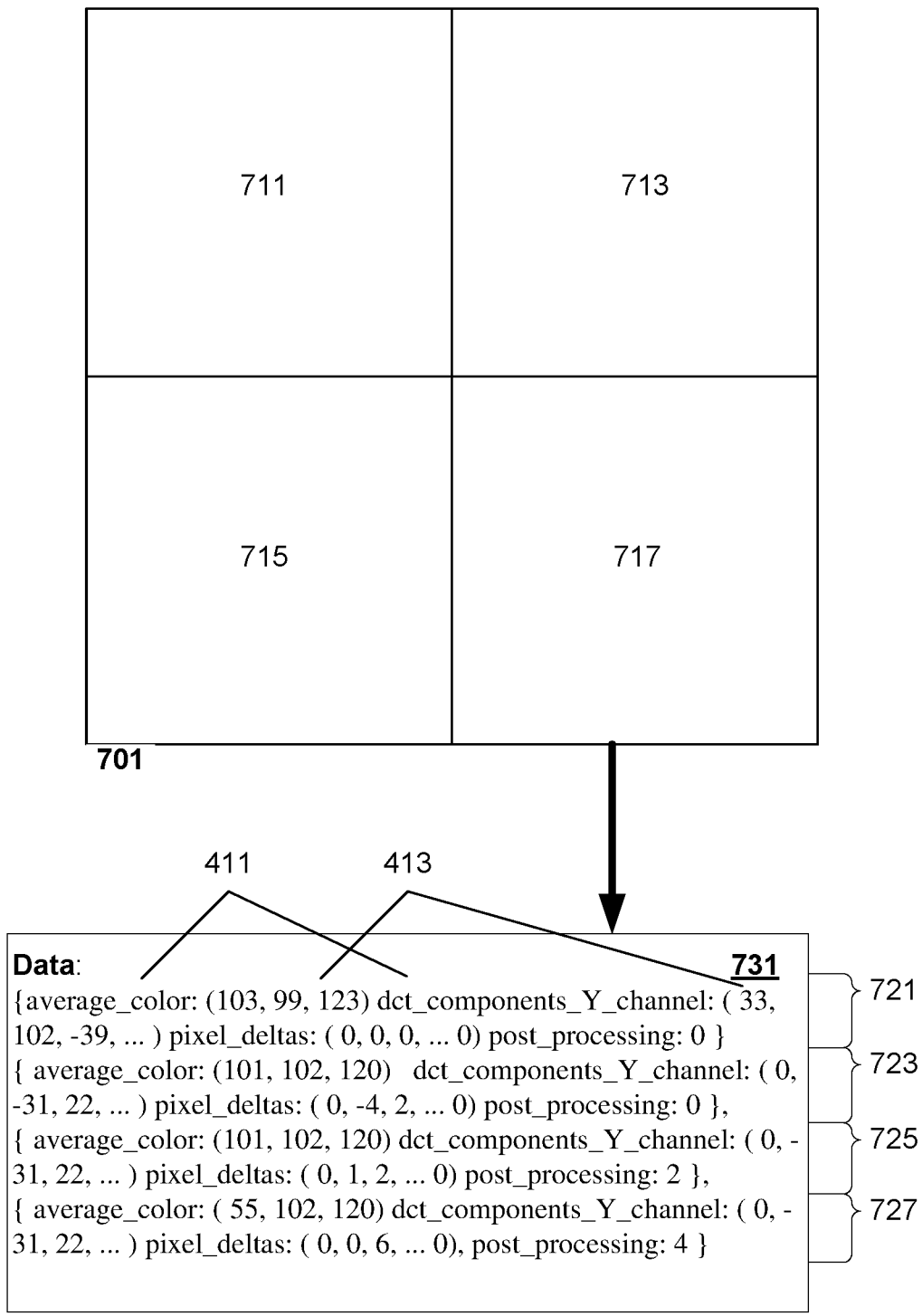
FIG. 7 is an example flow diagram of converting unstructured data to structured records.

Classifiers may include details about the unstructured record which, when combined together, allow the unstructured record to be recreated. For instance, an image file, such as image 701 of FIG. 7 may be made up of an array of pixels, with each pixel being defined by red, green, and blue (RGB) values. The image 701 may be segmented into even segmented parts 711-717, such as 8 pixel×8 pixel squares.

Classifiers may be generated for each segmented part, with each classifier being defined by classifier values. For instance, image 701 may be defined by classifiers for each segmented part, such as the average color value, the discrete cosine transform components of a Y channel (i.e., intensity channel), pixel based delta (i.e., differences between two pixel values), and post processing, such as artifact reduction. Additional classifiers, such as an over-complete set of functions (i.e., many ways to specific the same values) and correlations between the high frequency components of a segmented part, such as the correlation between the Y channel and blue channel may also be included. Each classifier may be associated with a respective one or more classifier values. Although the current example shows classifiers for an image, classifiers for audio data, video data, etc., may be generated. For instance, classifiers may include density-based spatial clustering of applications with noise (DBSCAN) or a Gaussian Mixture Model.

For each segmented part, the classifiers and their respective classifier values may be used to define field tags and field data in a respective structured record. For instance, the classifiers for segmented part 711 may be used to generate data structure 721. In this regard, the classifiers of segmented part 711 including the average color value, the discrete cosine transform components of the Y channel, pixel based delta, and post processing may be used to generate the field tags 411 "average_color," "dct_components_Y_channel," "pixel_deltas," and "post_processing." Moreover, the classifier values associated with the classifiers of segmented part 711 may be used to define the field data 413 of the respective field tags. Data structures 723-727 may be generated from the classifiers and classifier values of segmented parts 713-17.

Figure 8:
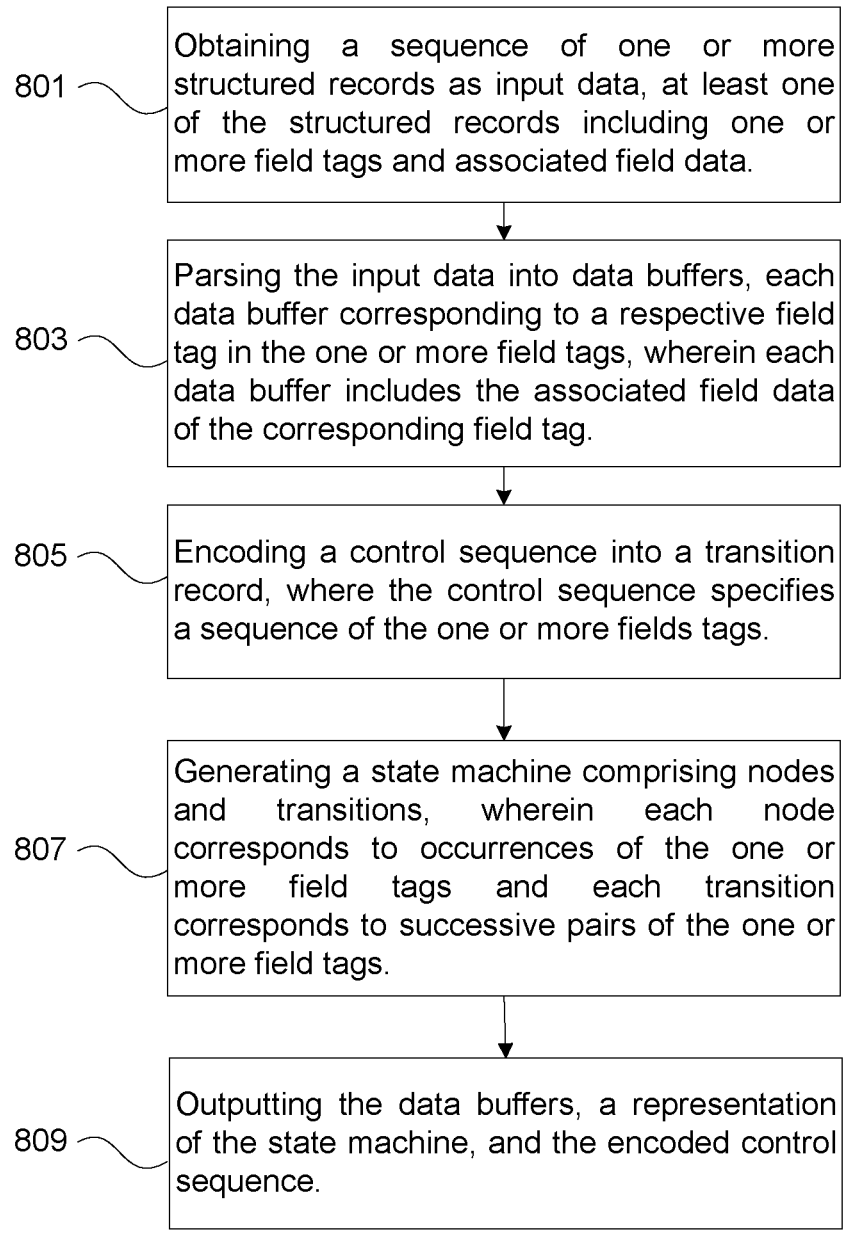
FIG. 8 is a flow diagram in accordance with aspects of the disclosure.

Flow diagram 800 of FIG. 8 is an example flow diagram of some of the aspects described above that may be performed by one or more computing devices such as client computing devices 120, 130, or 140. It is understood that the steps discussed herein are merely an example; the steps may occur in a different order, steps may be added, and steps may be omitted. In this example, a sequence of one or more structured records may be obtained by one or more processors as input data, each structured record including one or more field tags and associated field data, as shown in block 801. As shown in block 803, the input data may be parsed into data buffers, each data buffer corresponding to a respective field tag in the one or more field tags, wherein each data buffer includes the associated field data of the corresponding field tag. A control sequence may be encoded into a transition record, where the control sequence specifies a sequence of the one or more fields tag, as shown in block 805. A state machine comprising nodes and transitions may be generated, as shown in block 807, wherein each node corresponds to occurrences of the one or more field tags and each transition corresponds to successive pairs of the one or more field tags. The data buffers, a representation of the state machine, and the encoded control sequence may be output, as shown in block 809.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for encoding data, the method comprising:
obtaining, by one or more processing devices, input data comprising a sequence of structured records, each of the structured records including one or more field tags and field data associated with the one or more field tags;
parsing, by the one or more processing devices, the input data into data buffers, each data buffer corresponding to a respective field tag in the one or more field tags, wherein each data buffer includes the field data associated with the corresponding field tag;
parsing, by the one or more processing devices, the one or more field tags into a control sequence, wherein the control sequence represents an order the one or more fields tags occur in the sequence of structured records;
determining, by the one or more processing devices, a transition between successive pairs of the one or more field tags in the control sequence;
encoding, by the one or more processing devices, a transition label for each determined transition into a transition record;
generating, by the one or more processing devices, a state machine comprising nodes and node transitions, wherein each node corresponds to occurrences of the one or more field tags and each node transition corresponds to at least one of the determined transitions; and
outputting, by the one or more processing devices, the data buffers, a representation of the state machine, and the transition record.

2. The method of claim 1, wherein prior to the outputting, the data buffers, the representation of the state machine, and the transition record are compressed individually.

3. The method of claim 2, wherein a different compression algorithm may be used to compress the data buffers, the representation of the state machine, and the transition record.

4. The method of claim 1, wherein two or more of the one or more field tags are the same, and a single data buffer corresponds to the two or more field tags.

5. The method of claim 1, wherein at least one of the one or more field tags are not associated with field data and the at least one of the one or more field tags are not parsed to a corresponded data buffer.

6. The method of claim 1, wherein separation field tags indicating a separation of one structured record to another structured record may be interspersed through the control sequence.

7. The method of claim 1, wherein the successive pairs of the one or more field tags with only a single transition are not encoded into the transition record.

8. The method of claim 1, wherein the successive pairs of the one or more field tags which occur more frequently in the control sequence are encoded with a transition label having a bit sequence which is more compact than that of the successive pairs of the one or more field tags having less common transitions.

9. A system for encoding data, comprising:
one or more computing devices; and
memory storing instructions, which when executed by the one or more computing devices, cause the one or more computing devices to:
obtain input data comprising a sequence of structured records, each of the structured records including one or more field tags and field data associated with at least one of the one or more field tags;
parse the input data into data buffers, each data buffer corresponding to a respective field tag in the one or more field tags, wherein each data buffer includes the field data associated with the corresponding field tag;
parse the one or more field tags into a control sequence, wherein the control sequence represents an order the one or more fields tags occur in the sequence of structured records;
determine a transition between successive pairs of the one or more field tags in the control sequence;
encode a transition label for each determined transition into a transition record;
generate a state machine comprising nodes and node transitions, wherein each node corresponds to occurrences of the one or more field tags and each node transition corresponds to at least one of the determined transitions; and
output the data buffers, a representation of the state machine, and the transition record.

10. The system of claim 9, wherein prior to the outputting, the data buffers, the representation of the state machine, and the transition record are compressed individually.

11. The system of claim 10, wherein a different compression algorithm may be used to compress the data buffers, the representation of the state machine, and the transition record.

12. The system of claim 9, wherein two or more of the one or more field tags are the same, and a single data buffer corresponds to the two or more field tags.

13. The system of claim 9, wherein at least one of the one or more field tags are not associated with field data and the at least one of the one or more field tags are not parsed to a corresponded data buffer.

14. The system of claim 9, wherein separation field tags indicating a separation of one structured record to another structured record may be interspersed through the control sequence.

15. The system of claim 9, wherein the successive pairs of the one or more field tags with only a single transition are not encoded into the transition record.

16. The system of claim 9, wherein the successive pairs of the one or more field tags which occur more frequently in the control sequence are encoded with a transition label having a bit sequence which is more compact than that of the successive pairs of the one or more field tags having less common transitions.

17. A non-transitory computer readable medium storing instructions, which when executed by one or more parallel processors, cause the one or more parallel processors to perform the steps of:
obtaining input data comprising a sequence of structured records, each of the structured records including one or more field tags and field data associated with the one or more field tags;
parsing the input data into data buffers, each data buffer corresponding to a respective field tag in the one or more field tags, wherein each data buffer includes the field data associated with the corresponding field tag;
parsing the one or more field tags into a control sequence, wherein the control sequence represents an order the one or more fields tags occur in the sequence of structured records;

determining a transition between successive pairs of the one or more field tags in the control sequence;

encoding a transition label for each determined transition into a transition record;

generating a state machine comprising nodes and node transitions, wherein each node corresponds to occurrences of the one or more field tags and each node transition corresponds to at least one of the determined transitions; and outputting the data buffers, a representation of the state machine, and the transition record.

18. The non-transitory computer readable medium of claim 17, wherein two or more of the one or more field tags are the same, and a single data buffer corresponds to the two or more field tags.

19. The non-transitory computer readable medium of claim 17, wherein separation field tags indicating a separation of one structured record to another structured record may be interspersed through the control sequence.

20. The non-transitory computer readable medium of claim 17, wherein the successive pairs of the one or more field tags with only a single transition are not encoded into the transition record.

* * * * *